United States Patent
Poveda Lerma et al.

(10) Patent No.: US 8,373,517 B2
(45) Date of Patent: *Feb. 12, 2013

(54) POWER SUPPLY CABLE FOR POWER LINE COMMUNICATION EQUIPMENT

(75) Inventors: Antonio Poveda Lerma, Valencia (ES); Miguel Gargolla Parra, Almacera (ES); Jorge Blasco Claret, Valencia (ES)

(73) Assignee: Marvell Hispania, S.L.U., Madrid (ES)

( * ) Notice: Subject to any disclaimer, the term of this patent is extended or adjusted under 35 U.S.C. 154(b) by 0 days.

This patent is subject to a terminal disclaimer.

(21) Appl. No.: 13/465,979

(22) Filed: May 7, 2012

(65) Prior Publication Data

US 2012/0218050 A1    Aug. 30, 2012

Related U.S. Application Data

(63) Continuation of application No. 12/513,720, filed as application No. PCT/ES2007/000251 on Apr. 26, 2007, now Pat. No. 8,174,335.

(30) Foreign Application Priority Data

Nov. 6, 2006    (ES) .................................. 200602807

(51) Int. Cl.
   *H04B 3/56*    (2006.01)
   *H01P 1/00*    (2006.01)
(52) U.S. Cl. ......................................... 333/12; 333/260
(58) Field of Classification Search ............ 333/12, 333/20, 24 R, 181, 260
   See application file for complete search history.

(56) References Cited

U.S. PATENT DOCUMENTS

| 5,346,410 | A | * | 9/1994 | Moore, Jr. ................. 439/607.01 |
| 5,461,351 | A | * | 10/1995 | Shusterman ................... 333/181 |
| 5,650,908 | A | | 7/1997 | Stanton |
| 6,150,896 | A | | 11/2000 | DeCramer et al. |
| 6,329,906 | B1 | | 12/2001 | Fisher et al. |
| 6,507,260 | B1 | | 1/2003 | Baumann et al. |
| 8,174,335 | B2 | * | 5/2012 | Poveda Lerma et al. ....... 333/12 |
| 2002/0110310 | A1 | | 8/2002 | Kline |
| 2003/0160684 | A1 | | 8/2003 | Cern |
| 2004/0227622 | A1 | | 11/2004 | Giannini et al. |

FOREIGN PATENT DOCUMENTS

| FR | 2 750 256 | 12/1997 |
| JP | 2006-351860 | 12/2006 |
| JP | 2007-129687 | 5/2007 |

OTHER PUBLICATIONS

Office Action mailed Nov. 8, 2011, in corresponding Japanese Patent Application No. 2007-098110, and its English translation; 4 pages.
International Search Report issued Sep. 5, 2007 in the International (PCT) Application of which the present application is the U.S. National Stage.

* cited by examiner

*Primary Examiner* — Dean O Takaoka

(57) ABSTRACT

A connector including a magnetic core and a cable. The cable includes a first conductor and a second conductor. The first conductor and the second conductor are wound around each other. The cable is wound a plurality of times through a center of and around the magnetic core. A first end of the first conductor and a first end of the second conductor are configured to connect to power line communication equipment. A second end of the first conductor and a second end of the second conductor are configured to connect to a power line.

14 Claims, 2 Drawing Sheets

POWER SUPPLY CABLE FOR POWER LINE COMMUNICATION EQUIPMENT

CROSS-REFERENCE TO RELATED APPLICATIONS

This application is a continuation of U.S. patent application Ser. No. 12/513,720 filed on Oct. 27, 2009, which is a national stage application of PCT Application No. PCT/ES07/00251, filed Apr. 26, 2007, which claims the benefit of Spanish Application No. P200602807, filed Nov. 6, 2006. The disclosures of the above applications are incorporated herein by reference in their entirety.

BACKGROUND

As stated in the title of this descriptive specification, the present invention relates to a process for reduction of the common mode current for power line communications equipment, which has the object of reducing the level of common mode signal in order to satisfy the standards of different countries on power line communications equipment, all of which without having to reduce the injected power, which would worsen the coverage and the efficiency of the communications system.

In general, the invention is applicable to any electric circuit in which the common mode current needs to be reduced and more particularly in electric circuits used in telecommunications equipment which use the mains network as transmission medium.

Defined below are some terms which are used in this document. Let a signal source be formed from an electric generator, a circuit via which the generated current flows and an additional circuit suitable for passing current coming from the generator and connected to the circuit in some way. Common mode current is defined as being that current which flows through the conductor and returns via the circuit or the source.

Moreover, common mode choke is described as being that device capable of attenuating or reducing the level of the common mode current in an electric circuit. Power line communications equipment is likewise defined as the type of communication by means of electrical defined as the type of communication by means of electrical signals that use the low, medium or high tension electrical mains network as communications channel.

In the majority of electrical systems, common mode currents need to be attenuated due to their actual functioning, with the aim of reducing the electromagnetic interference with other devices.

The state of the art already contains devices for reducing common mode currents, as an example of which one can cite switched power supply sources which use common mode filters for reducing their conducted and radiated electromagnetic emissions [which can be found in many different documents such as AN 15 on POWER INTEGRATIONS]. Another example is communications by means of Ethernet cable, fitted with common mode chokes for reducing their conducted and radiated emission levels in the corresponding frequency band.

There currently do not exist devices for reducing in any effective way common mode levels in power line communications systems, and the devices existing and used in other applications are of no use for this type of communications on account of their limitations regarding working voltages and attenuations in differential mode. Moreover, in order for the reduction in common mode current to be effective, both the way in which the common mode, choke is constructed and its location in the communications circuit are of overriding importance.

SUMMARY

In order to achieve the objectives and avoid the drawbacks stated in the above sections, the invention consists of a process for reduction of the common mode current for power line communications equipment, where the mains network is used as the communications medium, and which at least comprises applying the signal transmitted by the communications equipment via a common mode choke circuit; characterized in that the signal (transmitted by the communications equipment via a common mode choke circuit) is applied on braided signal cables belonging to the common mode choke circuit mounted around a toroidal magnetic core. In this manner, the differential mode inductance is minimized.

The common mode choke can be located internally or externally to the communications equipment. If it is internal, its position will be as an output element from the power line communications equipment. If it is external, its position will be between the communications equipment and the injection point into the mains network. One particular case is to locate the special common mode choke at the injection point of the communications signal to the mains network, which has the added advantage of increasing the impedance of the common mode loop.

Below, in order to facilitate a better understanding of this specification and forming an integral part thereof, some figures are attached in which, on an illustrative rather than limiting basis, the object of the invention has been represented.

DESCRIPTION

Figure 1:
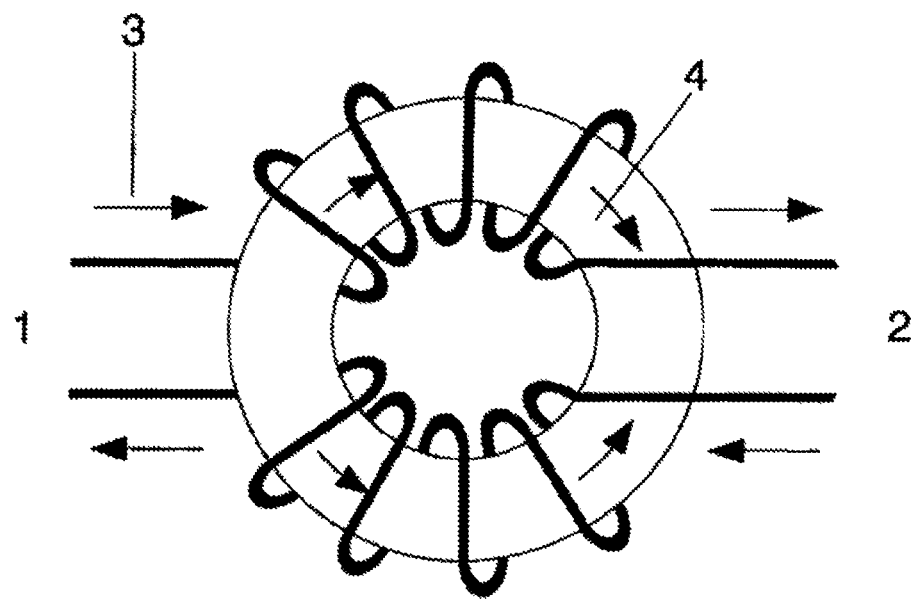
FIG. 1 represents a type of choke circuit of those known conventionally, which presents impedance in common and differential mode.

A description is made forthwith of an example of the invention, making reference to the numbering adopted in the figures.

In order to introduce PLC (power line communications) products in the market, it is necessary to satisfy the regulations concerning electromagnetic emissions on PLC devices. One of the most important requirements is the limit of common mode current which, on a standard basis, is measured with a device known as a T-shaped Impedance Stabilization Network, or T-ISN, in a controlled environment. With this measurement, the common mode is obtained coming from the Device Under Test (DUT). In this measurement, part of the differential signals coming from the DUT are converted into common mode signals, owing to the longitudinal conversion loss or LCL.

Power line communications equipment usually has a switched mode power supply or SMPS source connected to the mains network at the same point where the communications signal is injected. This SMPS represents an unbalanced load connected in parallel with the PLC signal source, with which, when starting to transmit, a certain amount of differential signal will, be converted into common mode, owing to parasite capacities, and the result of the measurement with the T-ISN will be a larger common mode than expected.

One solution to this problem is to reduce the power transmitted by the PLC equipment, but this entails various drawbacks, such as worse coverage and a lower transmission capacity (throughput).

Even in the case that the injected PLC signal were to be completely balanced (in other words, purely differential), measurement with T-ISN imposes a certain quantity of common mode current on the probe, which can only be reduced by decreasing the power of the signal. If the injected signal has a certain amount of common mode current, this will be measured additionally on top of that of the current probe, which makes it important to maintain the signal output from the PLC equipment as balanced as possible.

The objective of the present invention is to succeed in reducing the level of common mode signal in order to satisfy the regulations of different countries, in such a way that it is not necessary to make a sudden reduction in the injected power, which would worsen the coverage and the efficiency of the communications system.

The method employed for this consists of using a special common mode choke at the output from the PLC equipment which reduces common mode emissions as much as possible. This choke can be located both internally and externally to the communications equipment, depending on the type of equipment it is wished to develop.

In the state of the art, conventional common mode chokes are used to suppress electromagnetic interference (or EMI) in switched sources. These chokes are designed for achieving a powerful attenuation on the common mode signal without saturating its magnetic cores and, ideally, they can be represented as high impedance for common mode signals and a short-circuit for differential signals.

In FIG. 1 one can see one of these conventional chokes, where (1) represents the input, (2) the output, (3) the path of the current and (4) the direction of the field within the choke. Chokes of this kind are valid for the purpose for which they were created, namely, attenuating the noise in common mode coming from the power supply source and permitting the passage of 50 Hz currents without saturating the magnetic core, but they are not suitable for PLC technology on account of their impedance characteristics.

In the state of the art there exist two types of common mode (CM) chokes for EMI purposes. On the one hand there are toroidal CM chokes which perform well at high frequency, in other words, with high self-resonance frequency or SRF, but which present low impedance in common mode. On the other hand, there exist common mode chokes that are spool wound, which perform well at low frequencies, namely they have high impedance in low frequency common mode, but perform badly at high frequencies (due to having a low SRF). Both types of commercial chokes present impedance in common mode and in differential mode.

For PLC equipment the impedance has to be in common mode only, so neither toroidal CM chokes nor spool wound chokes can be used due to the presence of a residual inductance.

Figure 2:
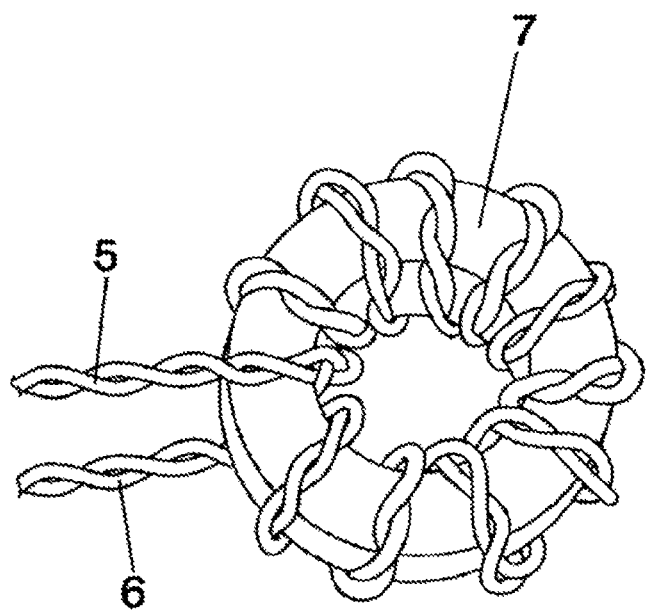
FIG. 2 shows the choke used by the invention for reducing the common mode signal.

In order to achieve the stated objective, the proposed method consists of injecting the signal through a special common mode choke consisting of braided signal cables mounted around a toroidal magnetic core, which minimizes the dispersion inductance. This special choke can be seen in FIG. 2, where (5) indicates the signal input (output of the PLC equipment), (6) the signal output (to the mains network) and (7) the magnetic torus.

Figure 3:
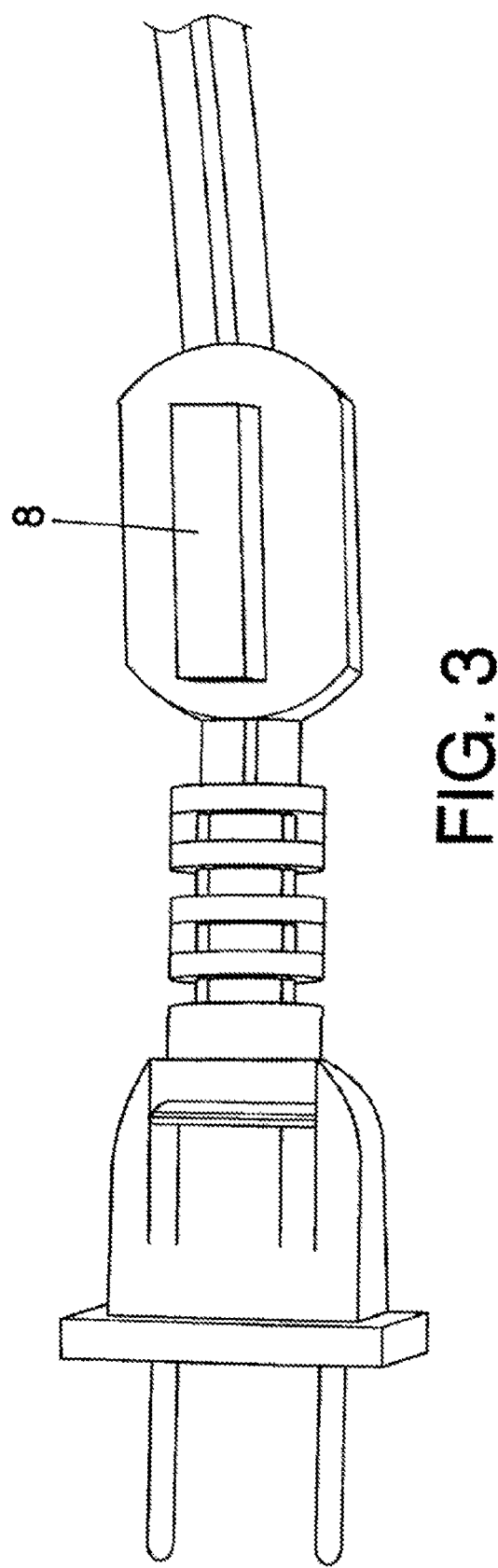
FIG. 3 shows an example of the location of the choke of the invention in the power supply cable for the power line communications device, in which the choke is located at the injection point of the signal to the mains.

In the majority of cases, in order to reduce common mode currents from the signal source, this special common mode choke needs to be included at the output from the PLC equipment. In the case of tabletop communications equipment the common mode signal can be reduced further by placing the choke between the PLC equipment and the injection point to the mains. The optimum location point for the special common mode choke is the injection point of the communications signal to the mains, which the special choke can achieve at the end of the power supply cable for the equipment which can be seen in FIG. 3 as (8).

What is claimed is:

1. A connector, comprising:
   a magnetic core; and
   a cable including a first conductor and a second conductor, wherein the first conductor and the second conductor are wound around each other, and wherein the cable is wound a plurality of times through a center of and around the magnetic core,
   wherein a first end of the first conductor and a first end of the second conductor are configured to connect to power line communication equipment, and
   wherein a second end of the first conductor and a second end of the second conductor are configured to connect to a power line.

2. The connector of claim 1, further comprising:
   a housing enclosing i) the magnetic core, ii) a first portion of the first conductor, and iii) a first portion of the second conductor;
   a cord having a first portion and a second portion, wherein each of the first portion of the cord and the second portion of the cord extends from the housing, wherein a second portion of the first conductor and a second portion of the second conductor pass through the first portion of the cord, and wherein a third portion of the first conductor and a third portion of the second conductor pass through the second portion of the cord; and
   a plug, wherein a portion of the plug is connected to the second portion of the cord, and wherein the portion of the plug includes a first terminal and a second terminal respectively connected to the second end of the first conductor and the second end of the second conductor.

3. The connector of claim 1, wherein the magnetic core is toroidal-shaped.

4. A system comprising:
   the connector of claim 1; and
   the power line communications equipment.

5. The system of claim 4, wherein the magnetic core is arranged closer to the power line than to the power line equipment.

6. Power line communications equipment, comprising:
   a power supply;
   a signal generator; and
   a choke including
      a magnetic core, and
      a cable including a first conductor and a second conductor,
      wherein the first conductor and the second conductor of the cable are wound around each other,
      wherein the cable is wound a plurality of times through a center of and around the magnetic core,
      wherein each of a first end of the first conductor and a first end of the second conductor is connected to both the power supply and the signal generator, and wherein a second end of the first conductor and a second end of the second conductor are configured to connect to a power line.

7. The power line communications equipment of claim 6, wherein the magnetic core is located closer to the power line than to the power line equipment.

8. The power line communications equipment of claim 6, further comprising:
   a housing enclosing i) the magnetic core, ii) a first portion of the first conductor, and iii) a first portion of the second conductor;
   a cord having a first portion and a second portion, wherein each of the first portion of the cord and the second portion of the cord extends from the housing, wherein a second portion of the first conductor and a second portion of the second conductor pass through the first portion of the cord, and wherein a third portion of the first conductor and a third portion of the second conductor pass through the second portion of the cord; and
   a plug, wherein a portion of the plug is connected to the second portion of the cord, and wherein the portion of the plug includes a first terminal and a second terminal respectively connected to the second end of the first conductor and the second end of the second conductor.

9. The power line communications equipment of claim 6, wherein the magnetic core is toroidal-shaped.

10. A network device comprising:
    a power supply configured to generate a power signal;
    a signal generator configured to generate a data signal; and
    a connector including
       a magnetic core,
       a cable including a first conductor and a second conductor,
       wherein the first conductor and the second conductor are wound around each other,
       wherein the cable is wound a plurality of times through a center of and around the magnetic core,
       wherein a first end of the first conductor and a first end of the second conductor are connected to both the power supply and the signal generator, and
       wherein a second end of the first conductor and a second end of the second conductor are configured to connect to a power line.

11. The network device of claim 10, wherein the magnetic core is located closer to the power line than to the network device.

12. The network device of claim 10, wherein the magnetic core is located internally to the network device.

13. The network device of claim 10, further comprising:
    a housing enclosing i) the magnetic core, ii) a first portion of the first conductor, and iii) a first portion of the second conductor;
    a cord having a first portion and a second portion, wherein each of the first portion of the cord and the second portion of the cord extends from the housing, wherein a second portion of the first conductor and a second portion of the second conductor pass through the first portion of the cord, and wherein a third portion of the first conductor and a third portion of the second conductor pass through the second portion of the cord; and
    a plug, wherein a portion of the plug is connected to the second portion of the cord, and wherein the portion of the plug includes a first terminal and a second terminal respectively connected to the second end of the first conductor and the second end of the second conductor.

14. The network device of claim 10, wherein the magnetic core is toroidal-shaped.

\* \* \* \* \*